Feb. 18, 1941.  J. L. SHROYER  2,232,567
ACCELERATION INDICATOR
Filed Jan. 19, 1940
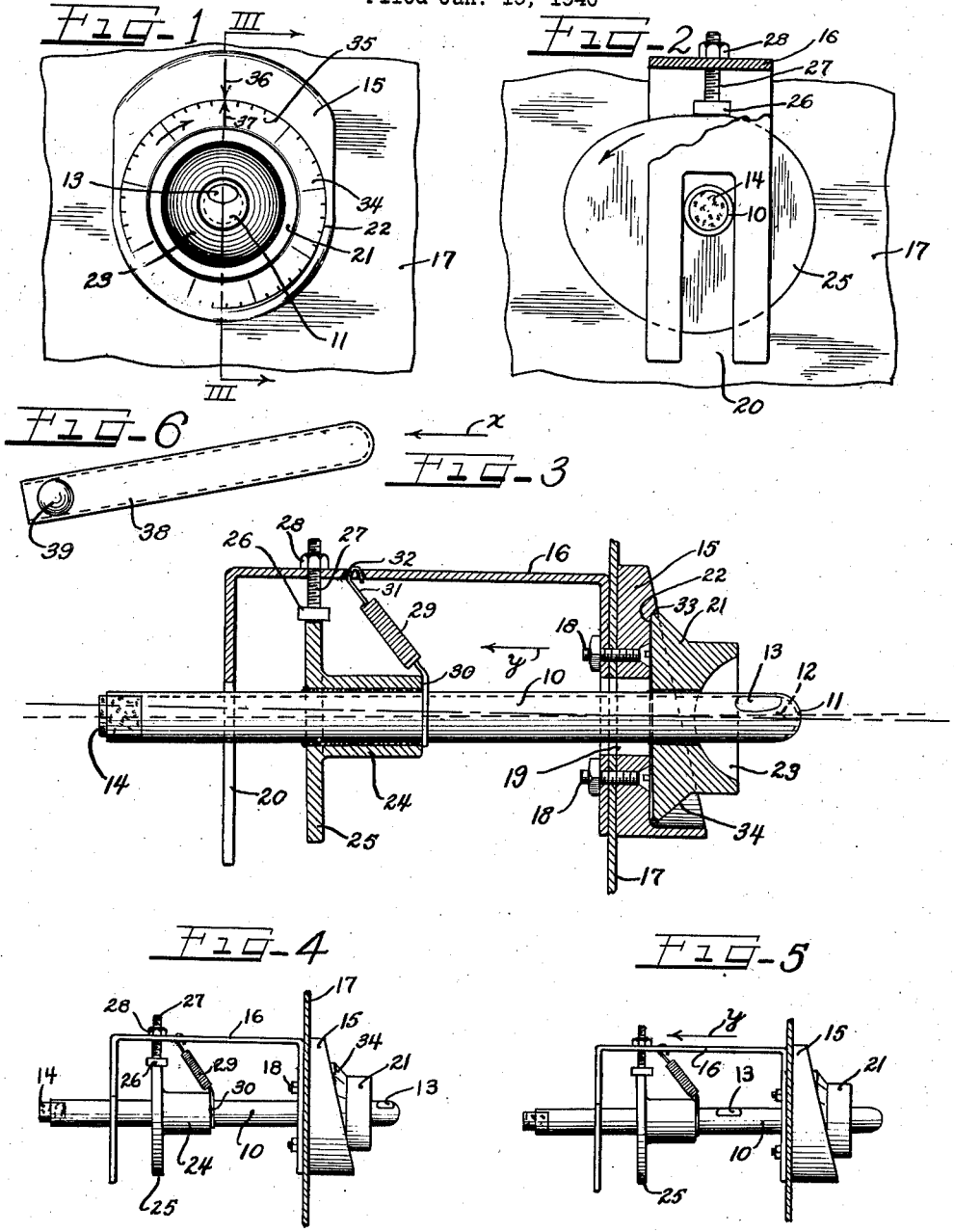
Inventor
Jacob L. Shroyer
by Charles... Attys Patented Feb. 18, 1941

2,232,567

UNITED STATES PATENT OFFICE 2,232,567

ACCELERATION INDICATOR

Jacob L. Shroyer, Oak Park, Ill.

Application January 19, 1940, Serial No. 314,579

11 Claims. (Cl. 264—1)

My invention relates to acceleration indication and to an improved instrument or gauge for indicating and measuring acceleration of moving bodies, the invention being particularly useful and adaptable in connection with automotive vehicles for measuring and checking up on the acceleration or so-called "pick-up."

An important object of the invention is to produce an instrument which is very sensitive and will accurately indicate acceleration. The principle of operation of my improved instrument includes the principles of relative movement between an inclined plane and a mass where the inclined plane is moved with accelerated motion relative to the mass. If the acceleration movement of the plane is in a horizontal direction toward the mass thereon, the mass will be raised along the incline when the acceleration reaches a value sufficient to develop a force which will overcome the weight, inertia and other elements tending to resist movement of the mass, and if the acceleration continues to exceed such resistance, the mass will eventually be at the top of the incline. I prefer to employ a bubble tube which is substantially a spirit level in which the tube or bulb is nearly filled with liquid, such as alcohol, to leave a bubble of air. The tube or bulb will then provide the incline relative to which the liquid and bubble will move under acceleration movement applied to the tube.

A further important object is to provide adjusting and dial means for leveling the tube or for setting it at the required incline for acceleration tests to be made.

My invention will be more fully understood from the following specification in connection with the drawing, in which drawing:

Figure 1 is a front elevation of the instrument applied to a support such as the instrument board in an automotive vehicle;

Figure 2 is a rear view of the instrument and its support;

Figure 3 is a section on plane III—III of Figure 1;

Figure 4 is a side elevation to reduced scale showing the instrument at rest;

Figure 5 is a view similar to Figure 4 showing the operation when the acceleration force is applied to the instrument; and Figure 6 shows a tube with a ball therein for more clearly illustrating the principles of operation of the instrument shown on Figures 1 to 5.

In the structure shown, the indicating element is the straight tube 10 closed at one end by its semi-spherical bottom 11, and being nearly filled with suitable fluid 12, such as alcohol, to leave a bubble 13, the open end of the tube, after filling of the tube, being sealed as by a plug 14. The tube is of transparent material such as glass.

The supporting structure for the tube comprises a front wall or plate 15 and an inverted U-shaped frame 16. The supporting wall 17 for the instrument may be the instrument panel of an automotive vehicle, and this panel may be received between the front wall 15 and the front leg of the U-frame to be clamped in place by bolts 18. The front wall 15, the front leg of the U-frame, and the supporting panel have registering openings so as to provide a passageway 19 for the tube 10, this passageway being of sufficiently larger diameter than the tube to permit inclination of the tube away from the horizontal. The rear leg of the U-frame has the slot 20 through which the tube extends, this slot being vertical and of substantially the same diameter as the tube so as to guide the vertical inclination of the tube and hold it against lateral displacement.

Secured to the tube 10 at a distance inwardly from the outer end thereof and concentric therewith is a knob 21 which has a circular base for seating in a circular recess 22 in the wall 15, so that by means of the knob the tube may be turned on its longitudinal axis. The outer end of the knob has the recess 23 surrounding the tube so as to expose more of the outer end of the tube for viewing the bubble 13 when the bubble is at the outer portion of the tube.

Within the U-frame 16 a sleeve or hub 24 receives and is secured to the tube, and this sleeve carries a cam disk 25 at its inner end. An abutment plate 26 is provided for the cam and has a threaded stem 27 extending through a threaded opening in the upper wall of the U-frame 16 so that the abutment 26 may be adjusted vertically by turning of the stem, a lock nut 28 on the stem locking the stem and abutment in adjusted position. Upon turning of the knob 21 and tube, the cam structure will be rotated in engagement with the abutment 26 and the inclination of the tube from horizontal may be effected, the cam disk shown being one of progressively increasing radius distance from the axis of the tube. As shown, a spring 29 has its end 30 looped around the tube 10 to engage against the outer end of the cam sleeve 24, the spring extending diagonally inwardly and upwardly with its end 31 hooked to the upper wall of the frame 16, as indicated at 32, this spring tending to hold the tube inwardly with the knob 21 engaging in the recess 22 and with the cam under the abutment 26, so that when the knob is turned for inclination of the tube, the engagement of the upper portion of the base of the knob against the upper wall of the recess will provide a fulcrum as indicated at 33. The spring will also keep the cam in engagement with the abutment 26. The knob 21 has the frusto-conical dial surface 34 provided with calibration indications 35 for indicating cooperation with a zero or starting mark 36 on the wall 15, as clearly shown on Figure 1.

When the instrument is to be attached to an automotive vehicle, such as an automobile, as for example to the instrument panel, the installation should be such that when the vehicle is on level ground and the cam 25 at its shortest radius point is in engagement with the abutment 26, the tube 10 should be level. It may be that after installation of the instrument, the tube may be slightly out of level, and this can be determined by the movement of the bubble in the tube, but the abutment 26 may be readily adjusted by turning of its stem 27 to bring the tube into level or horizontal position, and the starting mark 37 on the knob dial will then be in register with the mark 36 on the wall 15 and the instrument is ready for use for testing of acceleration of the vehicle. When the instrument is installed, its outer end will be in front of the instrument panel and the outer end of the tube will be visible to the driver, the tube extending in a vertical plane parallel with the vertical plane of the longitudinal axis of the vehicle with the inner end of the tube toward the front of the vehicle.

Describing now the principle of operation of the device, if, instead of the liquid containing tube 10 shown in Figure 3, a tube 38 with a ball 39 therein, as shown on Figure 6, is used, the bottom wall of the tube will form an incline for the ball 39 when the tube is at an angle with the horizontal. Gravity and inertia will tend to hold the ball at the inner or lower end of the tube, but if the tube 38 were moved in the direction of the arrow X under sufficient acceleration to overcome the inertia, weight, or other elements tending to resist movement of the ball, the ball would be moved up along the incline, and if the acceleration continued to exceed the resistance to movement of the ball, the ball would eventually be at the outer or high end of the tube. The principle of operation is the same where the mass in the tube is liquid which, when shifted, displaces a bubble, such as in the arrangement shown in Fig. 3.

Referring to Figure 3, the knob has been turned clockwise (Figure 1) for engagement of the cam with the abutment 26 for setting of the tube 10 at a comparatively slight angle with the horizontal or level position. With this setting, the bubble 13 will be at the outer end of the tube fully visible to the driver. The bubble is held up by the buoyant force of the liquid, and the bubble always seeks the highest level of the liquid which, in the setting shown in Figure 3, is at the outer or high end of the tube. Now, when the vehicle is suddenly accelerated while traveling along a substantially level road, or is started under acceleration from a state of rest, as for example at a stop light, the bubble will start to move toward the inner end of the tube when the acceleration reaches a value sufficient to develop a force which would tend to cause the liquid to move up the incline to which the tube is set. The lower wall of the tube forms the incline for the liquid, and the upper wall of the tube forms the incline for the bubble. When the tube is suddenly put under acceleration in the direction of the arrow Y, then pressure is applied to the liquid in the tube substantially in a longitudinal direction, but the entire liquid cannot move outwardly of the tube, as the inner end of the tube is sealed, and the only portion of the liquid which can become displaced under the acceleration impact is that portion of the liquid below the bubble. Under such impact of the tube against this portion of the liquid, the liquid under the outer part of the bubble will tend to rise and force the bubble inwardly along the tube, the liquid directly behind the bubble being then displaced downwardly to compensate for the rise of level of the liquid along the outer end of the bubble, and as long as the acceleration is sufficiently great and continues, a wall of water of rising level is built up against the outer end of the bubble and the bubble is forced rearwardly toward the inner end of the tube, and this motion of the bubble is very rapid. The displacement of the fluid around the bubble to force it inwardly along the tube is against the resistance to movement of the liquid up the inclined lower wall of the tube, and the resistance of the bubble against moving inwardly in the tube to a lower level. Where the tube is only slightly inclined as shown on Figure 3, correspondingly small acceleration of the vehicle will overcome the resistance to displacement of the liquid and to inward movement of the bubble, but greater angles of inclination of the tube will require greater acceleration before the bubble will move inwardly. Figure 4 shows the bubble at the outer end of the tube, while Figure 5 shows inward travel of the bubble under acceleration in horizontal direction indicated by the arrow Y.

The acceleration of the tube required to move the bubble inwardly under different inclination angles of the tube can be readily calculated, and the dial 34 can be calibrated accordingly. Now if, for example, the acceleration or so-called "pick-up" of an automotive vehicle is to be tested or checked, what the acceleration or pick-up should be, if the vehicle is funtioning properly, is known, and the knob 21 is turned for corresponding inclination of the tube and indication by the dial. The vehicle is then driven, and if the acceleration is as it should be, this fact will be indicated by the sudden inward movement and disappearance of the bubble from the outer end of the tube. If the acceleration is not what it should be, the bubble will not be displaced from the outer end of the tube. The driver then turns the dial back for less inclination of the tube and makes further tests until the acceleration is sufficient to move the bubble back in the tube. Thus, the percentage of efficiency of the vehicle pick-up can be readily and accurately determined by my improved sensitive instrument.

After a setting is made of the instrument for testing the acceleration for travel of the vehicle over level roads, no further setting need be made for travel of the vehicle on upgrade or downgrade. Figure 3 shows the tube set to a comparatively small angle of inclination with the horizontal. With modern cars where the acceleration or pick-up is comparatively high, the angle of inclination of the tube will be greater and may be as much as 18° or 20° from the horizontal. When the vehicle reaches a downgrade, the angle of inclination of the tube from horizontal will be increased, and the resistance of the instrument will be correspondingly increased. However, such increase in resistance is offset and accounted for by the force of gravity on the vehicle traveling downgrade, and therefore the acceleration caused by engine drive of the vehicle will operate the instrument for proper checking of the vehicle pick-up.

My improved instrument could be permanently mounted on vehicles or could be a unitary portable structure for temporary mounting on vehicles for test purposes, as in garages. The instrument could also be used for efficient testing of the acceleration or pick-up of aircraft or other motor driven craft.

I have shown a practical and efficient embodiment of my invention, but I do not desire to be limited to the exact construction or arrangement shown and described, as changes and modifications may be made without departing from the scope of my invention.

I claim as follows:

1. An acceleration meter comprising a straight closed tube not quite filled with liquid so as to leave a bubble, supporting means for supporting said tube on an automotive vehicle whose acceleration is to be checked and with the tube extending longitudinally in the vertical plane of the direction of travel of the vehicle, a setting member rotatable on said supporting means and secured to said tube for rotation thereof, a cam element on said tube for cooperation with said supporting means whereby when said setting means is turned said tube may be set to the desired angle of inclination with the low end thereof in advance and with the bubble tending to remain in the trailing or high end of the tube, the inertia characteristics and the inclination of said tube determining the acceleration movement to which the tube must be subjected before acceleration movement of the liquid toward the high end of the tube is effected, whereby the acceleration of the vehicle is determined by the movement of the bubble toward the low end of the tube by the displaced liquid.

2. An acceleration meter for the purpose described comprising a supporting frame, a closed tube partially filled with liquid so as to leave a bubble which tends to remain at the high end of the tube, a dial knob rotatable on said frame and secured to said tube for rotation of the tube with the dial knob, a cam secured on said tube, an adjustable abutment on said frame for said cam whereby upon turning of said cam said tube may be adjusted to level position or at an inclination with horizontal.

3. An acceleration meter for the purpose described comprising a supporting frame, a closed tube partially filled with liquid so as to leave a bubble which tends to remain at the high end of the tube, a dial knob rotatable on said frame and secured to said tube for rotation of the tube with the dial knob, a cam secured on said tube, an adjustable abutment on said frame for said cam whereby upon turning of said cam said tube may be adjusted to level position or at an inclination with horizontal, and indications on said dial knob and frame cooperable for indication of the acceleration movement of the tube necessary for causing the bubble to be accelerated toward the low end of the tube.

4. An acceleration meter for the purpose described comprising a supporting frame, a setting member rotatable on said frame, a closed tube having a mass therein tending to move toward one end of the tube in response to acceleration, said tube being mounted on said member with its longitudinal axis in the axis of rotation of said member, and means effective upon rotation of said member to tilt said member for the desired inclination of said tube from horizontal.

5. An acceleration meter for the purpose described comprising a supporting frame, a setting member rotatable on said frame, a closed tube having a mass therein tending to move toward one end of the tube in response to acceleration movement of the tube, said tube being mounted on said member with its longitudinal axis in the axis of rotation of said member, and cam means between said member and frame effective upon rotation of said member to tilt said member in a vertical plane for the desired inclination of said tube from horizontal.

6. An acceleration indicating device comprising a supporting frame, a setting member rotatable on said frame, a closed tube having a mass therein tending to move toward one end of the tube when said tube is subjected to acceleration movement, said tube being mounted on said member to extend through the axis of rotation thereof, a cam movable with said member, and a cam abutment on said frame engageable by said cam whereby when said member is rotated it will be tilted in a vertical plane for setting of said tube in horizontal position or at an inclination from horizontal.

7. An acceleration meter comprising a supporting frame, a closed tube partially filled with liquid so as to leave a bubble which tends to remain at the high end of the tube, a setting member rotatable on said frame and mounting said tube coaxially therewith, a cam movable with said member, and an abutment on said frame for said cam whereby upon turning of said member and tube said tube may be adjusted to level position or at an inclination with horizontal.

8. An acceleration meter comprising a vertically disposed stationary frame, a setting member rotatably mounted on said frame with its axis disposed horizontally, a tube having a mass therein responsive to acceleration movement of the tube, said tube being secured to said member with its longitudinal axis in the axis of rotation of said member, and cooperating elements operable in response to rotation of said member to effect tilting of said member on said frame in a vertical plane whereby said tube may be set to extend horizontally or at an angle with horizontal.

9. An indicating device comprising a frame, a tube supported by said frame with its longitudinal axis horizontally disposed and having a mass therein responsive to acceleration movement of the tube, means for rotating said tube on its longitudinal axis, means responsive to said tube rotation for effecting tilting of said tube in a vertical plane whereby said tube may be set to horizontal or level position or to a position inclined from horizontal, and means for indicating such positions.

10. An indicating device comprising a supporting frame, a spirit level on said frame, means for rotating said spirit level on its longitudinal axis, means responsive to such rotation of said spirit level for effecting movement thereof in the vertical plane of its longitudinal axis to a position with said axis horizontal or to a position with said axis at a desired angle with horizontal, and means for indicating such positions.

11. An acceleration meter comprising a vertically disposed frame having a cylindrical recess in one side thereof, a circular member rotatable in said recess, a tube secured to said member with its longitudinal axis in the axis of rotation of said member, said tube containing a mass responsive to acceleration movement of the tube, a cam rotatable with said member, an abutment on said frame engaged by said member whereby when said member is rotated said tube will be tilted for setting to horizontal position or at an inclination from horizontal, and spring means holding said member in said recess and said cam in cooperative relation with said abutment.

JACOB L. SHROYER.